United States Patent Office 3,101,363
Patented Aug. 20, 1963

3,101,363
PROCESS FOR PRODUCING TRIS(2-BUTOXY-ETHYL)PHOSPHITE
Charles F. Baranauckas, Niagara Falls, and James J. Hodan, Tonawanda, N.Y., assignors to Hooker Chemical Corporation, Niagara Falls, N.Y., a corporation of New York
No Drawing. Filed Aug. 4, 1960, Ser. No. 47,362
7 Claims. (Cl. 260—461)

This invention relates to a novel organo-phosphorus compound and a process for preparing same. More particularly this invention relates to tris(2-butoxyethyl) phosphite and the method for preparing it.

Tris(2-butoxyethyl) phosphite may be used as a chemical intermediate for the preparation of tris(2-butoxyethyl) phosphate, the latter compound being an excellent stabilizer for wax emulsions used as floor waxes and the like. Tris(2-butoxyethyl) phosphite may also be used as an additive for paints as well as a stabilizer for vinyl resins.

It is an object of this invention to provide a novel organo-phosphorus compound.

A further object of the invention is to provide a composition consisting of tris(2-butoxyethyl) phosphite.

Still a further object of the invention is to provide an improved method of preparing tris(2-butoxyethyl) phosphite.

These and other objects of the invention will be apparent from the following detailed description.

It has now been discovered that when a triaryl phosphite is transesterified with a stoichiometric excess of "butyl Cellosolve" (2-butoxyethanol) in the presence of a basic catalyst, tris(2-butoxyethyl) phosphite is produced in high yield and purity after removing from the reaction mixture the resulting phenol and excess "butyl Cellosolve." The proprietary name "butyl Cellosolve" as used herein is to denote the compound 2-butoxyethanol.

Any triaryl phosphite capable of being transesterified with "butyl Cellosolve" under the reaction conditions obtained may be employed. Typical examples of suitable triaryl phosphites include: triphenyl phosphite, tricresyl phosphite and mixtures thereof.

The triaryl phosphite and "butyl Cellosolve" should be reacted in proportions sufficient to provide at least three moles and preferably greater than three moles of "butyl Cellosolve" per mole of triaryl phosphite.

A basic catalyst is admixed with the triaryl phosphite and "butyl Cellosolve" reactants prior to and/or during the reaction. Suitable basic catalysts include the alkali metals, alkali metal hydrides, alkali metal sulfides and mixtures thereof. For example, sodium, potassium, lithium, sodium hydride, potassium hydride, lithium hydride, sodium sulfide, potassium sulfide, lithium sulfide, etc. may be employed as the basic catalyst. The basic catalyst is added in a catalytic proportion, for example, between about 0.05 and about 5.0, and preferably between about 0.1 and about 1.5 percent by weight of the triaryl phosphite. However greater or lesser proportions of the catalyst may be employed if desired. It has been found that when the transesterification reaction is carried out in the presence of a basic catalyst, the reaction rate is increased, and the proportion of impurities in the product is markedly reduced. The transesterification reaction may be carried out at a temperature between about sixty and about one hundred and eighty degrees centigrade, the preferred reaction temperature depending upon the typical of triaryl phosphite employed.

The pressure during the transesterification is not critical since the reaction may be carried out at subatmospheric, atmospheric or superatmospheric pressures. It is preferred to employ subatmospheric pressure during the transesterification reaction when the phenol is being removed continuously.

During the reaction each of the three aryl radicals of the triaryl phosphite is replaced with a 2-butoxyethyl radical of the "butyl Cellosolve" to yield the tris(2-butoxyethyl) phosphite product. The phenol and unreacted "butyl Cellosolve" present in the reaction mixture may be distilled or otherwise separated from the reaction mixture, and substantially pure tris(2-butoxyethyl) phosphite is recovered from the residue.

The following example is presented to define the invention more fully without any intention of limiting the invention thereby. All parts and percentages are by weight unless otherwise specified.

*Example*

The apparatus of this example consisted of a one liter, three-neck flask equipped with a magnetic stirrer, heating mantle, condenser, K-head and thermometer.

Triphenyl phosphite (three hundred and ten grams, one mole), "butyl Cellosolve" (two hundred and thirty-six grams, two moles) and sodium hydride (0.5 gram) were added to the flask, mixed, and heated with agitation to one hundred and thirty degrees centigrade. After thirty minutes under these conditions the mixture was stripped to a pot temperature of one hundred and twenty-seven degrees centigrade (vapor temperature, eighty-five degrees centigrade) at thirteen millimeters' pressure. An additional 1.5 moles of "butyl Cellosolve" were added and the pot again stripped under the same conditions. This procedure was repeated three additional times after adding one hundred and eighteen grams (one mole) of "butyl Cellosolve" each time. A final stripping at a pot temperature of one hundred and seventy degrees centigrade at one millimeter of mercury pressure was made. A total of seven hundred and fifty-seven grams (6.5 moles) of "butyl Cellosolve" were used in this example. The residue, which weighed three hundred and forty-seven grams contained greater than ninety-five percent tris(2-butoxyethyl) phosphite by infrared analysis and contained 8.18 percent phosphorus. The yield of tris(2-butoxyethyl) phosphite was ninety-one percent based on the weight of phosphorus in the starting material.

It will be recognized by those skilled in the art that various modifications within the invention are possible, some of which have been referred to above. Therefore we do not wish to be limited except as defined by the appended claims.

We claim:

1. The method of preparing tris(2-butoxyethyl) phosphite which comprises transesterifying triaryl phosphite with 2-butoxyethanol in the presence of catalytic amount of a basic catalyst.

2. The process of claim 1 wherein said triaryl phosphite is triphenyl phosphite.

3. The process of claim 1 wherein said triaryl phosphite is tricresyl phosphite.

4. The process of claim 1 wherein said basic catalyst is selected from the group consisting of alkali metals, alkali metal sulfides, alkali metal hydrides and mixtures thereof.

5. The process of claim 1 wherein said basic catalyst is sodium hydride.

6. The process of claim 1 wherein the molar ratio of said 2-butoxyethanol to said triaryl phosphite is at least 3:1.

7. The process of preparing tris(2-butoxyethyl) phosphite which comprises reacting triphenyl phosphite and 2-butoxyethanol in proportions equivalent to a molar ratio of said 2-butoxyethanol to said triphenyl phosphite of at least 3:1 in the presence of a catalytic amount of sodium hydride at a temperature between about sixty and about one hundred and eighty degrees centigrade, separating the resulting tris(2-butoxyethyl) phosphite from the reaction mixture.

References Cited in the file of this patent

UNITED STATES PATENTS

| | | |
|---|---|---|
| 2,241,244 | Conary et al. | May 6, 1941 |
| 2,353,558 | Gzemski | July 11, 1944 |
| 2,728,790 | Sroog | Dec. 27, 1955 |
| 2,807,636 | Buls | Sept. 24, 1957 |
| 2,928,861 | Short | Mar. 15, 1960 |
| 2,957,905 | Gaertner | Oct. 25, 1960 |
| 2,970,166 | Rosin et al. | Jan. 31, 1961 |

OTHER REFERENCES

Hoffmann et al.: J. A. C. S., vol. 78, No. 22, November 20, 1956, pages 5817–5821.

Landauer et al.: "J. Chem. Soc." (1953), pp. 2224–2234.